United States Patent [19]
Inoue et al.

[11] 4,422,662
[45] * Dec. 27, 1983

[54] FRONT FORK CONSTRUCTION FOR MOTORCYCLE

[75] Inventors: Hidehiko Inoue, Ooi; Masao Nishikawa, Tokyo; Nobuo Anno, Urawa, all of Japan

[73] Assignee: Honda Giken Kogyo Kabushiki Kaisha, Tokyo, Japan

[ * ] Notice: The portion of the term of this patent subsequent to Jul. 14, 1998, has been disclaimed.

[21] Appl. No.: 235,555

[22] Filed: Feb. 18, 1981

Related U.S. Application Data

[62] Division of Ser. No. 59,286, Jul. 20, 1979, Pat. No. 4,278,266.

[51] Int. Cl.³ .............................................. B62K 25/08
[52] U.S. Cl. .................................. 280/276; 267/15 R
[58] Field of Search .............. 280/270, 271, 272, 274, 280/275, 276, 277, 279; 267/15 R; 180/219, 227

[56] References Cited

U.S. PATENT DOCUMENTS 1,223,572  4/1917  Drew .................................. 280/276
4,057,264  11/1977  Suzuki ................................ 280/276
4,278,266  7/1981  Inoue et al. ......................... 280/276

FOREIGN PATENT DOCUMENTS 522145  3/1955  Italy ..................................... 280/277

Primary Examiner—Joseph F. Peters, Jr.
Assistant Examiner—Ross Weaver
Attorney, Agent, or Firm—Lyon & Lyon

[57] ABSTRACT

A front wheel suspension assembly for a motorcycle includes parallel telescoping forks of the hydraulic shock absorber type which straddle the wheel and which are inclined in a forward direction. The bending moment imposed on the telescoping parts by this inclination is partly or fully opposed by a counter bending moment imposed by one or more springs positioned rearward of a vertical plane containing the wheel axis and below a bottom bridge joining the front fork tubes. The purpose is to reduce the frictional resistance between telescoping forks in their axial sliding motion. The springs apply the compensating bending moment between the telescoping parts.

7 Claims, 13 Drawing Figures

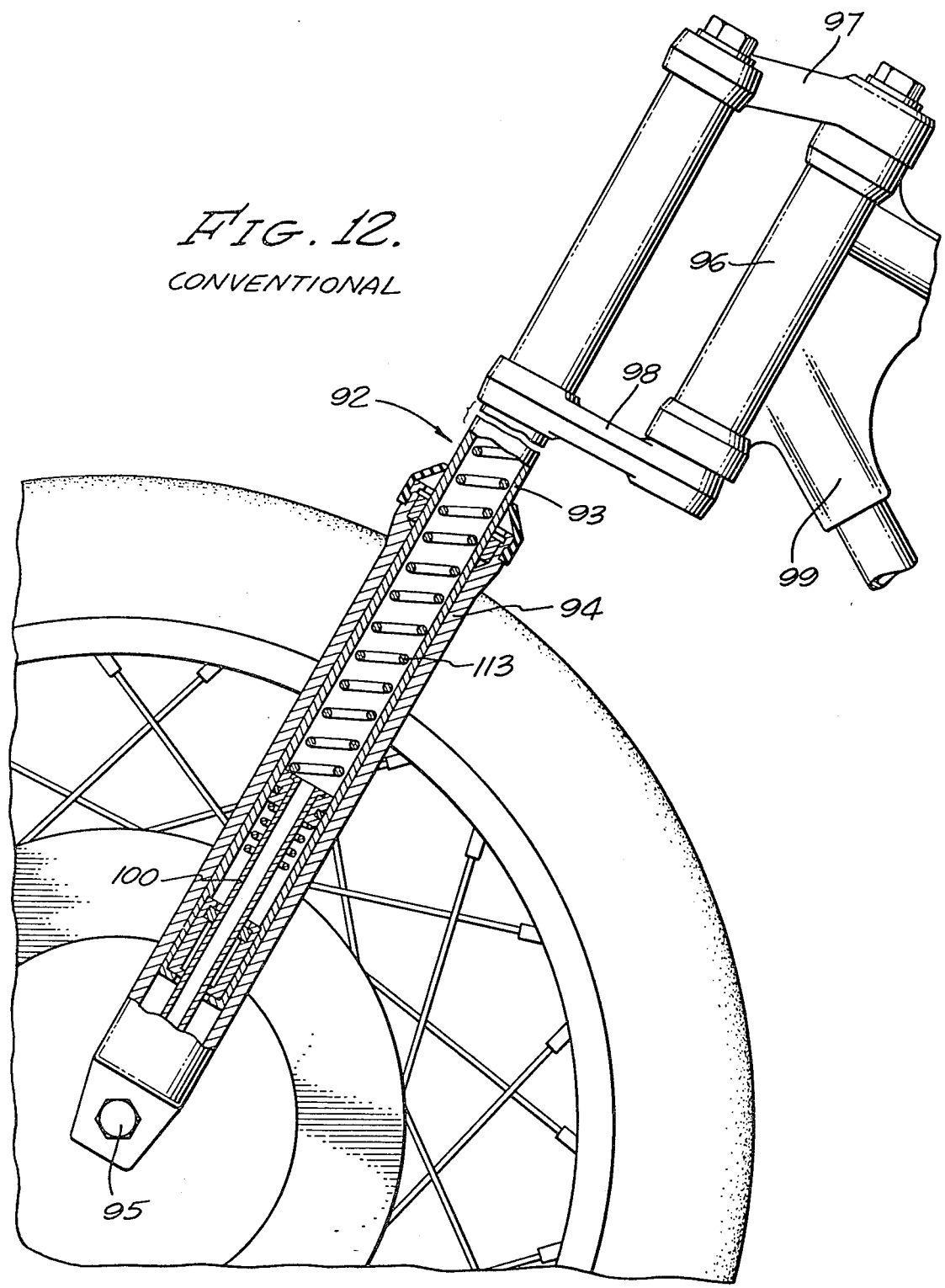
FIG. 12.
CONVENTIONAL

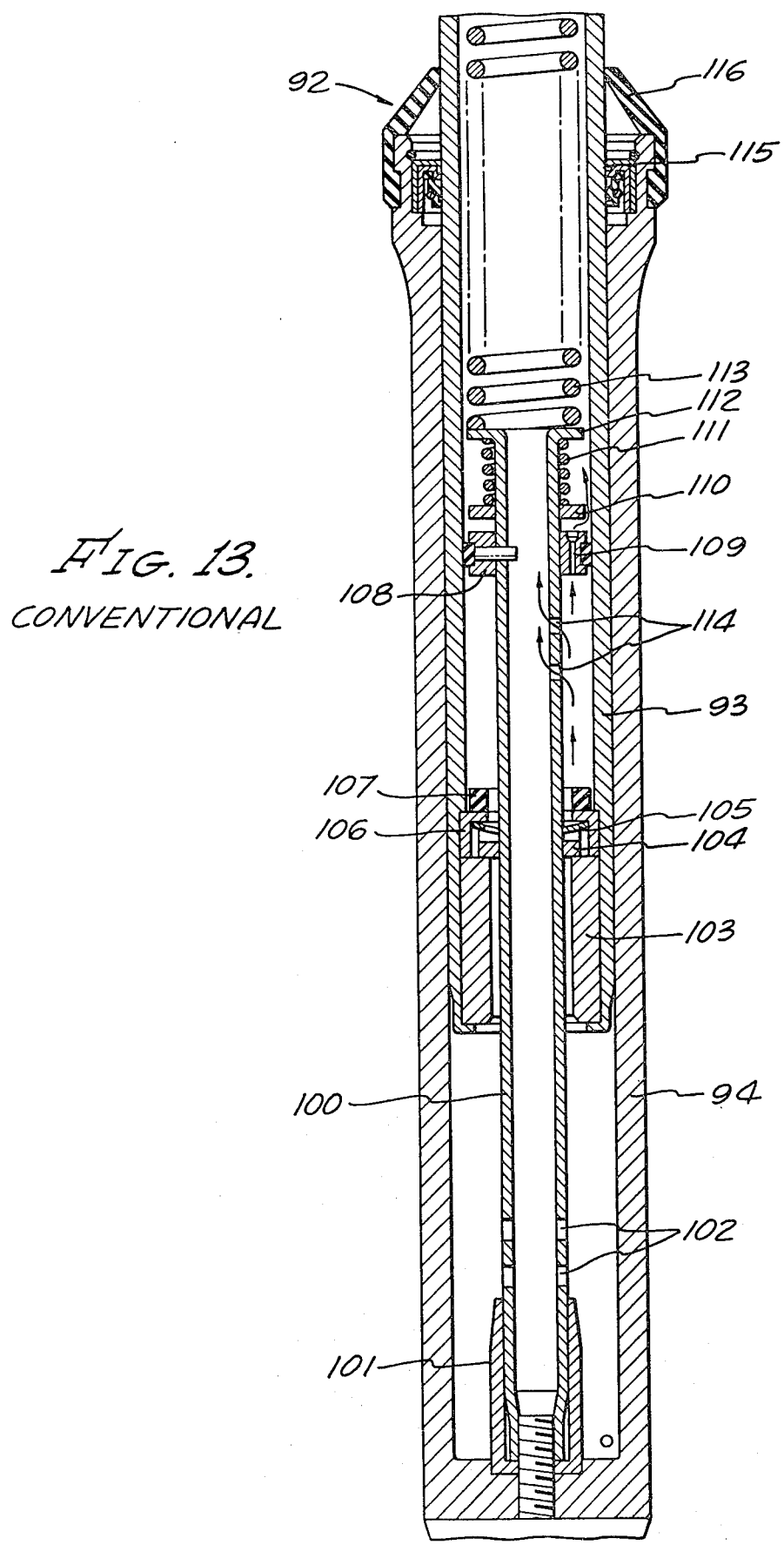
FIG. 13.
CONVENTIONAL

FRONT FORK CONSTRUCTION FOR MOTORCYCLE

This is a division of application Ser. No. 59,286 filed July 20, 1979, now U.S. Pat. No. 4,278,266.

This invention relates to a fork assembly straddling the front wheel of motorcycle, and is particularly directed to improvements in a front fork assembly having axially slidable telescoping tubes which are inclined with respect to a vertical line with the motorcycle supported in an upright position on a horizontal surface. The telescoping forks are of the hydraulic shock absorber type.

In accordance with this invention, means are provided to act on the tubes of the front fork assembly to apply forces tending to compensate for the bending moment which arises by reason of the inclination of the front fork assembly. This compensating effect reduces the frictional resistance between the telescoping forks in their axial sliding action. Smoother sliding action of the front fork tubes is attained, as well as improved shock absorbing performance and riding comfort. The compensation apparatus is disposed at a location lower than the bottom bridge joining the front fork tubes and behind the vertical line to the ground at the front wheel contact point, so as to achieve effective space utilization and to obtain the above effects without impairing handling or stability performance.

At the present time, front fork assemblies of the hydraulic type having telescoping tubes have been widely adopted in the suspension of the front wheel of motorcycles, for the advantages of increased running speed and improved handling and stability performance. However, undesirable friction resistance forces are developed between the telescoping parts in response to the bending moment imposed on them by their angular inclination. Consequently, it has been found that a telescopic front fork assembly does not perform shock absorbing functions unless the reaction from the road surface becomes greater than the frictional resistance between the telescoping tubes. The shock absorbing function of the tubes may then be insufficient, so that uncomfortable vibrations and road shocks are transmitted to the handle bars.

Because of this rough riding characteristic, proposals have been made to increase the strength and stiffness of the parts of the telescoping front fork assembly, together with improvements in bearings between the tubes to reduce the frictional resistance between them. However, the former serves only to reinforce the front fork assembly but not to reduce the frictional resistance between the telescoping tubes, and the latter requires further considerations of the strength, structure and design of the bearings.

In accordance with this invention, it has been found that the undesirable friction resistance is substantially reduced by providing one or more resilient members which act to compensate for the bending moment which results from the inclination of the front fork assembly. To achieve this result in practice, however, several potential problems must be considered. If a compensation means including the resilient member is provided ahead of the vertical line passing through the front wheel axle, the distance from the steering stem shaft to such resilient member would become greater, with the result that the moment of inertia of the front wheel assembly about its turning axis would be increased, to the detriment of satisfactory steering stability. Such a location for the compensation means would also be undesirable from the standpoint of space utility, since lamps such as head lamps and turning signal lamps are already mounted in this region.

Furthermore, if the compensation means including a resilient member is located above the bottom bridge, the fork pipes would be required to be expanded laterally, or the compensation apparatus would be positioned in a forward location, so that the moment of inertia of a fork assembly about the turning axis would also be increased. Another consideration is that the wiring harness assembly is usually arranged about the bottom bridge so that it is undesirable to locate the compensation apparatus in that position.

Thus, the position and space in which the compensation apparatus is located become a problem to be solved. Since many and most of the compensation apparatus and parts thereof are externally exposed to form a part of the design of the motorcycle, the problem must be solved also in respect of the appearance.

A solution to these problems is to provide a telescopic front fork assembly for motorcycles in which the sliding frictional resistances developed between the telescoping tubes because of the bending moment applied to the front fork assembly, are reduced to attain smooth sliding friction of the tubes and to improve shock absorber performance and riding comfort. This is accomplished by providing a resilient member to act on the front wheel supporting forks in the direction compensating for said bending moment. Another object of this invention is to provide a front fork assembly for motorcycles in which means are provided for compensating for the bending moment on the fork assembly while avoiding any material increase in the moment of inertia about the steering shaft connected to the handle bars, and by making effective use of an otherwise unused space, and all without impairing the appearance of the design. This is accomplished by locating the resilient member below the bottom bridge joining the forks and behind the vertical plane passing through the front wheel axle.

Other objects and advantages will appear hereinafter.

In the drawings:

FIG. 12 is a side elevation, partly in section, showing a conventional form of telescoping front forks of the hydraulic type.

FIG. 13 is a sectional side elevation showing details of conventional hydraulic shock absorber parts.

Figure 1:
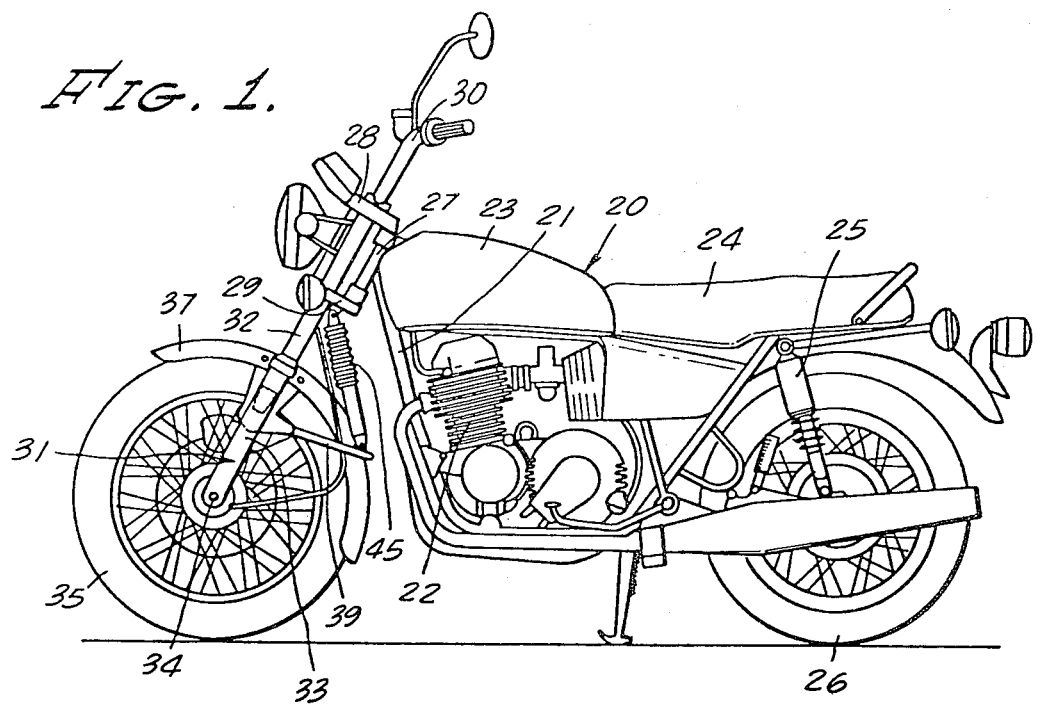
FIG. 1 is a side elevation of a motorcycle equipped with a preferred embodiment of this invention.

Referring to the drawings, the motorcycle shown in FIG. 1 and generally designated 20 is provided with an engine 22 in the middle portion of a frame 21, a fuel tank 23 above the engine, and a seat 24 behind the fuel tank. A rear wheel 26 is supported on a rear fork (not shown). Rear cushioning units 25 support the frame 21. A head tube 27 is fixed to the front end of the frame 21, and receives a steering shaft fixed to a top bridge 28 and a bottom bridge 29. Handle bars 30 are connected to the top bridge 28.

Fork tubes 32 of a telescopic front fork assembly 31 are fixed at their upper ends to the top and bottom bridges 28 and 29. The fork tubes 32 are telescopically received within bottom tubes 33 which carry the axle 34 of the front wheel 35 at their lower ends. The tubes 32 and 33 are of the hydraulic shock absorber type, and contain a body of oil which damps the telescopic movement and also lubriates the tubes. However, the internal parts of the shock absorber are omitted from all figures of the drawings (except FIGS. 19 and 20) for clarity of illustration. The front fork assembly 31 is inclined at an angle with respect to the ground line.

Figure 2:
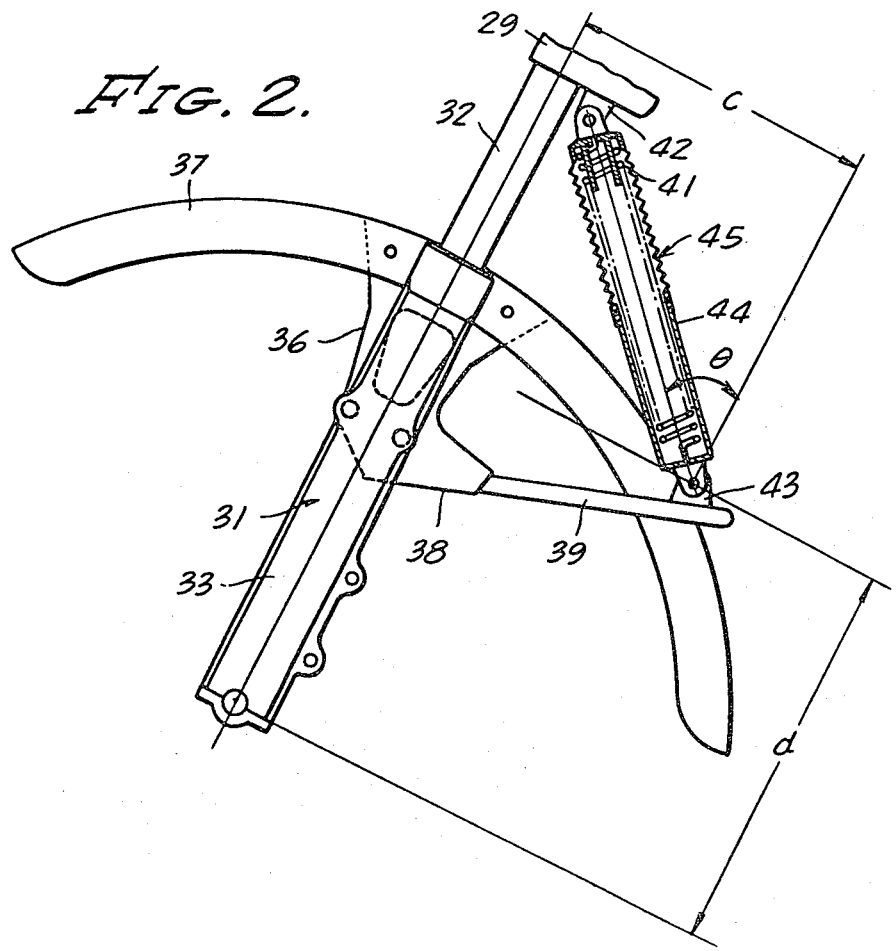
FIG. 2 is a side view, partly broken away, showing the compensation apparatus of FIG. 1 on an enlarged scale.

In accordance with this invention and as shown in FIGS. 1 and 2, brackets 36 which fix the fender 37 to the bottom tubes 33 are each provided with a rearwardly extending portion 38. A U-shaped torque arm 39 straddles a portion of the fender 37 and the forward ends of the arm are welded to the bracket portions 38 to provide a fender stay. The U-shaped torque arm 39 may be fixed to the fender 37. A pair of tension springs 41 extend between lugs 42 fixed to the bottom bridge 29 to lugs 43 fixed to the U-shaped arm or fender stay 39. Means for adjusting the tension in the springs 41 may be provided, if desired. The springs 41 may each be enclosed within a tubular shield 44 and expansible bellows 45.

Figure 3:
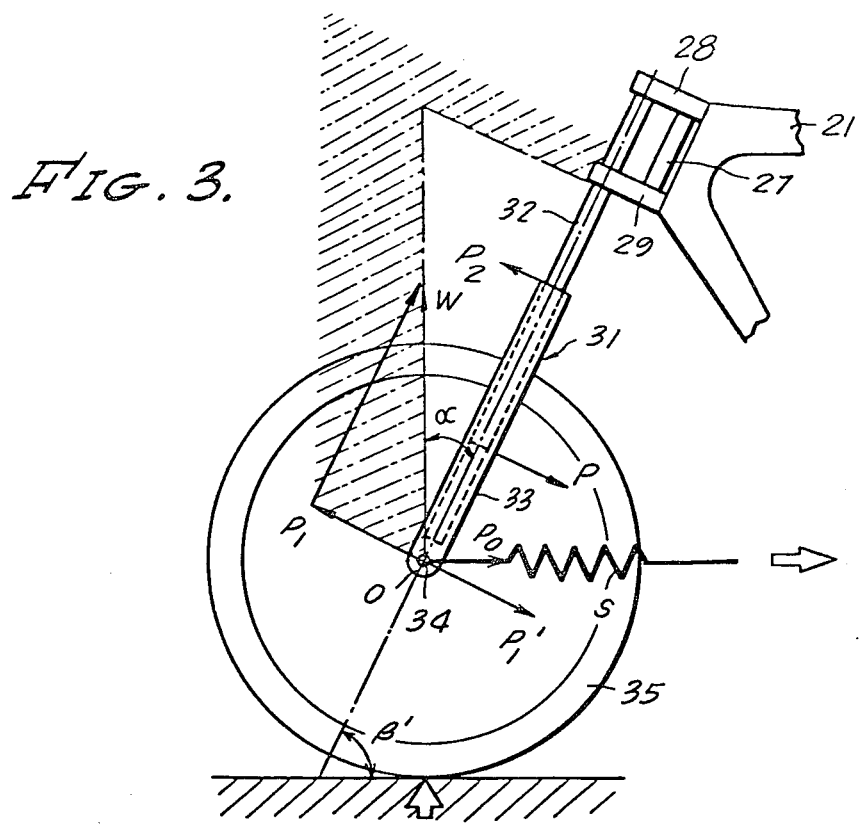
FIG. 3 is a schematic diagram showing the forces involved in the compensation apparatus.

In the schematic diagram of FIG. 3 there is shown the bending moment forces involved in compensation apparatus. If the axle input point represented by 0 is pulled with a force $P_1'$ and the direction reversed to that of the force $P_1'$, $P_1$ should be able to be neutralized or compensated with this force $P_1'$. In the event, however, that the point 0 is pulled in the direction of $P_1'$ with a resilient member, the axis of the resilient member would intersect with the road surface, and thus arranged, the resilient member would be positioned close to the road surface so that such a construction would be undesirable. However, if the axle point 0 is resiliently pulled rearwards with a tension spring S in the direction of the force $P_0$ parallel with the road surface, instead of in the direction of $P_1'$, the desired compensation would also be attained.

In such case, the value of $P_0$ is determined by the following formula:

$$P_1 = W \sin \alpha = P_1'$$

Therefore, $P_0$ is given by $$P_0 = (P_1/\cos \alpha) = (\sin \alpha / \cos \alpha) \times W$$

Where:
W: Reaction against load, in the vertical direction from road surface to the axle;
$\alpha$: 90 degrees − fork angle $\beta'$;
$P_1$: Component of W, in the direction at right angles to the axes of the front fork assembly, $P_1 = W \sin \alpha$;
P and $P_2$: Bearing loads;
$P_1'$: Equal and opposite to $P_1$.

By this construction the sliding friction of the telescoping tubes is reduced by compensating the force $P_1$ or by compensating the bearing load $P + P_2$ produced relatively to the force $P_1$. It should be noted in this case that in either compensation means, the position of the resilient member and its supporting member are determined as follows:

Referring to FIG. 3 which shows the position of the compensation apparatus, the means of compensating the forces $P_1$ and $P + P_2$ must be set under the following conditions.

The compensation means must be provided in the space behind the vicinity of the vertical line to the ground at the front wheel contact point (which is the same as the acting line of the reaction W in the vertical direction) and below the bottom bridge 29. When the compensation means is thus provided within the space to the right and below the hatched phantom lines, the previously described shortcomings are eliminated, i.e., the dead space is effectively utilized; the design of the front portion of the motorcycle is not impaired and the moment of inertia about the steering shaft is not increased. The optimum area is therefore the space behind the axis of the front fork assembly 31 and below the bottom bridge 29.

As shown in the diagram of FIG. 3, the tension spring S is connected at one end to the axle 34 at the lower end of the bottom tube 33 so that a pulling force may act in the direction of $P_0$ in order to compensate the force $P_1$ acting on the axle point of the bottom tube 33. Thus, the force $P_1$ on the axle point is compensated by the pulling force $P_0$ and the sliding frictional resistances caused by the bending moment between the inner and outer telescoping tubes of the front fork assembly are reduced.

Figure 4:
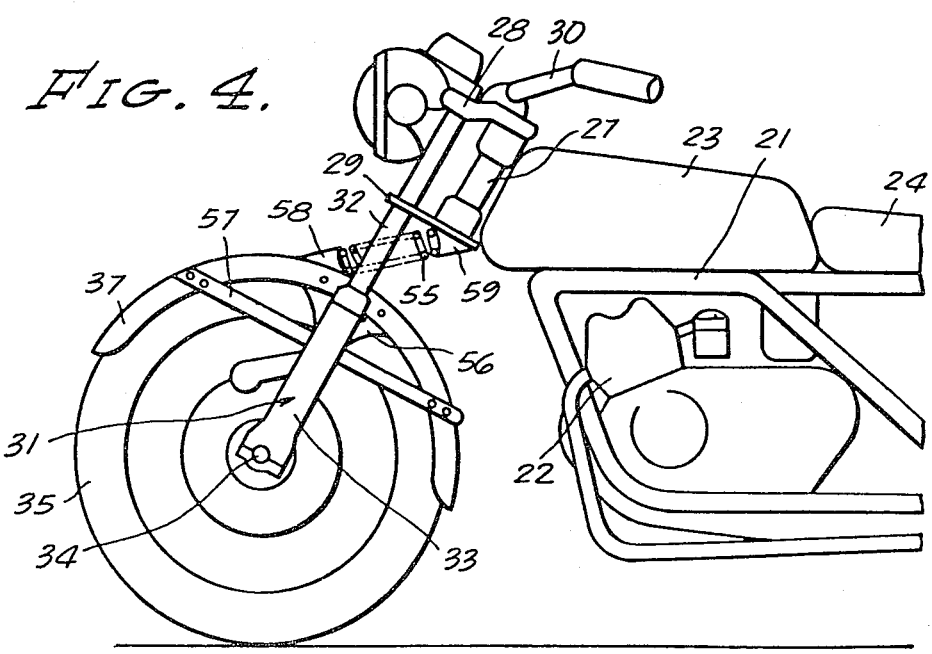
FIG. 4 is a side elevation, partly broken away, showing a modification.

In the form of the invention shown in FIG. 4, a compression spring 55 is used instead of one or more tension springs. The front fender 37 is secured to the bottom tubes 33 by means of bracket 56 and fender stays 57. A spring receiver or torque receiving element 58 is provided on the fender 37 at a location nearest to the bottom tube 33. Another spring receiver 59 is fixed on the lower surface of the bottom bridge 29 and a compression spring 55 is interposed between these spring receivers 58 and 59. In this way the upper ends of the bottom tubes 33 are resiliently pressed through the bracket 56 and/or fender stays 57 so that the bearing load developed by the bending moment may be effectively compensated. In other words, the bearing loads P and $P_2$ caused by the bending moment can be partially or fully compensated, with the result that the frictional resistance of the telescoping inner tubes 32 and outer tubes 33 can be reduced.

Figure 5:
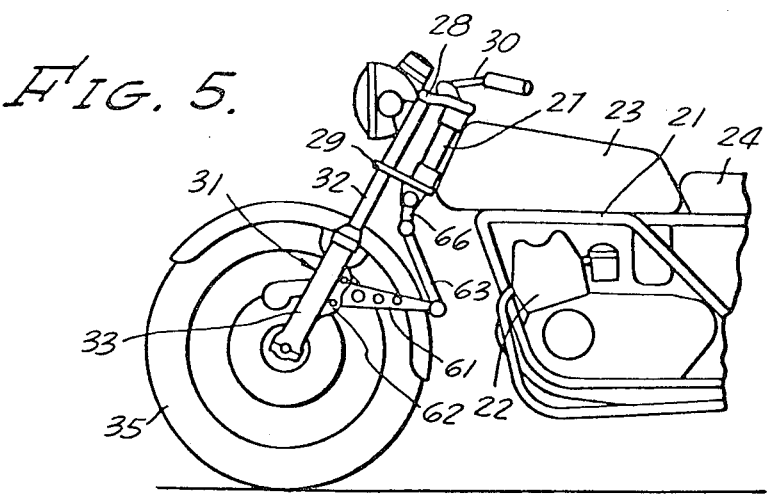
FIG. 5 is a side elevation partly broken away, showing a second modification.
Figure 6:
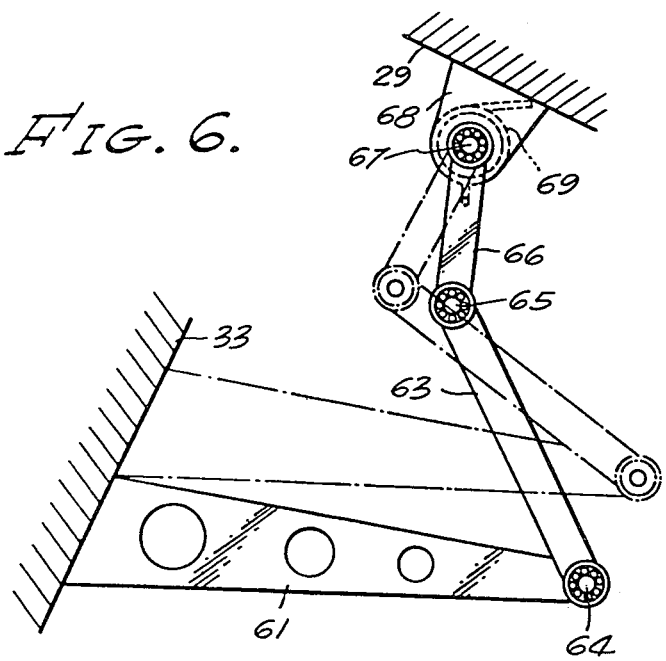
FIG. 6 is a schematic view of the compensation apparatus of FIG. 5.

In the form of the invention shown in FIGS. 5 and 6, a linkage mechanism is employed as the compensation means for the bending moment. Torque arms 61 with holes for reducing weight are fixed to the bottom tubes 33 by means of brackets 62. Each torque arm 61 has a link 63 pivotally connected to it at 64. The link 63 is pivotally connected at 65 to the link 66, which in turn is pivotally connected at 67 to the bracket 68 fixed to the bottom bridge 29. A torsion spring 69 acts to rotate the upper link 66 in a clockwise direction by applying an upward force to the outer end of the arm 61. Any other suitable or desirable spring such as a tension spring or a compression spring could be used instead of the torsion spring, as will be readily understood.

Figure 7:
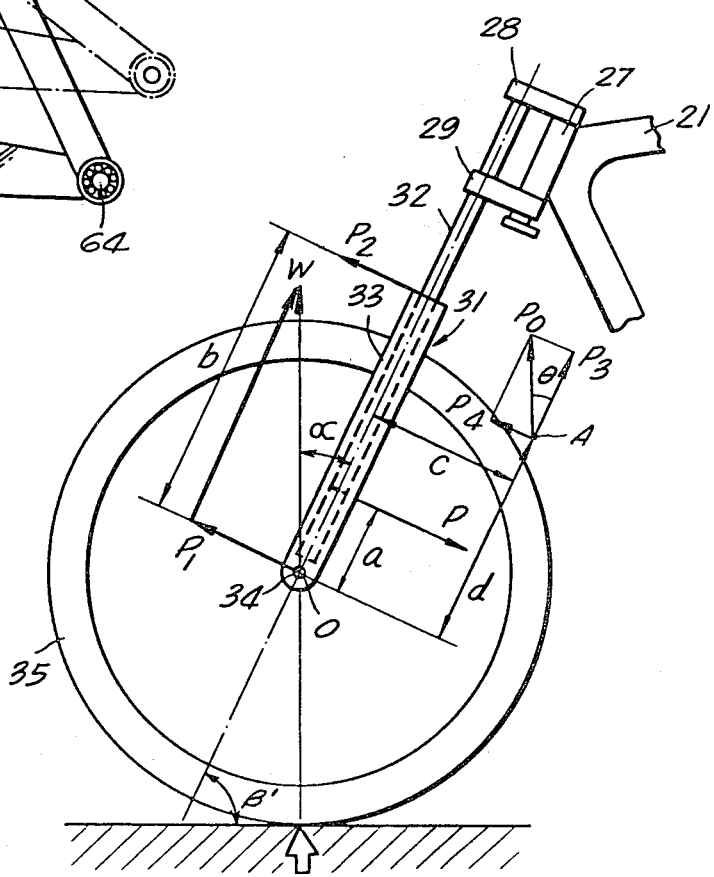
FIG. 7 is a schematic diagram used in calculating the magnitude of compensating forces.

The schematic diagram of FIG. 7 is used in the following explanation of the basic principle of bending moment compensation in apparatus such as that shown in FIGS. 1 and 2 of the drawings. In this embodiment, the resilient members are so arranged in the compensation direction that the bearing load $P+P_2$ on the bottom tubes 33 and fork pipes 32 caused by the component $P_1$ produced in response to the bending moment is reduced.

In order to compensate for the bearing load $P+P_2$, the bottom tubes 33 are resiliently urged at their upper end portions which receive the bearing load in the compensation direction with resilient members so that the load $P+P_2$ may be compensated or reduced.

More particularly, any point A positioned below the bottom bridge 29 constituting a steering part and behind the upper parts of the bottom tubes 33 and connected to the bottom tubes 33 is pulled as shown in FIG. 7 with a tension force $P_0$. This tension force $P_0$ can be divided at the point A into a component $P_4$ in the direction at a right angles with the axes of the front fork assembly 31 and a component $P_3$ parallel with the axes of the front fork assembly. In the event that the bottom tubes 33 are pulled in their upper part with a force $P_0$, the relative formulas are given as follows:

$$P_1 = W \sin \alpha$$

$$P = P_1 + P_2 + P_4 \ldots \quad (1)$$

$$aP = bP_2 + cP_3 + dP_4 \ldots \quad (2)$$

where:
W: Reaction against load, in the vertical direction from road surface to the axle;
$\alpha$: 90 degrees $-$ fork angle $\beta'$;
$P_1$: Component of W, in the direction at right angles to the axes of front fork assembly, $P_1 = W \sin \alpha$;
P and $P_2$: Bearing loads;
$P_3$ and $P_4$: Components of $P_0$:
a and b: Lengths from the load applied point 0 to the bearings:
c and d: Lengths to the force applied point A of $P_0$ respectively from the axes of the front fork assembly and from the point 0; and
$\theta$: Angle formed between the direction of $P_0$ and the axes of the front fork assembly.

If the formula of $P+P_2$ is obtained by substituting the formulas:

$$P_3 = P_0 \cos \theta)$$

$$P_4 = P_0 \sin \theta)$$

for the formulas (1) and (2), $$P + P_2 = \frac{a+b}{b-a} \times P_1 -$$

-continued $$\frac{2(c \cos \theta + d \sin \theta) - (a \sin \theta + b \sin \theta)}{b - a} \times P$$

therefore, in order to make $P+P_2$ equal to zero, $P_0$ may be:

$$P_0 = \frac{a+b}{2(c \cos \theta + d \sin \theta) - (a \sin \theta + b \sin \theta)} \times W \sin \alpha.$$

Since the original bearing load is $$P + P_2 = \frac{a+b}{b-a} \times W \sin \alpha$$

as described above, depending on what percent of this value is to be compensated, the value of $P_0$ will be determined by the position of the force applied point A of $P_0$ and $\theta$.

Likewise, even if the force application point A is positioned in front of the axis of the front fork, the resilient member of $P_0$ would only become a compression spring, the same formulas as the above would be applicable, and a compensating action would be obtained.

Figure 8:
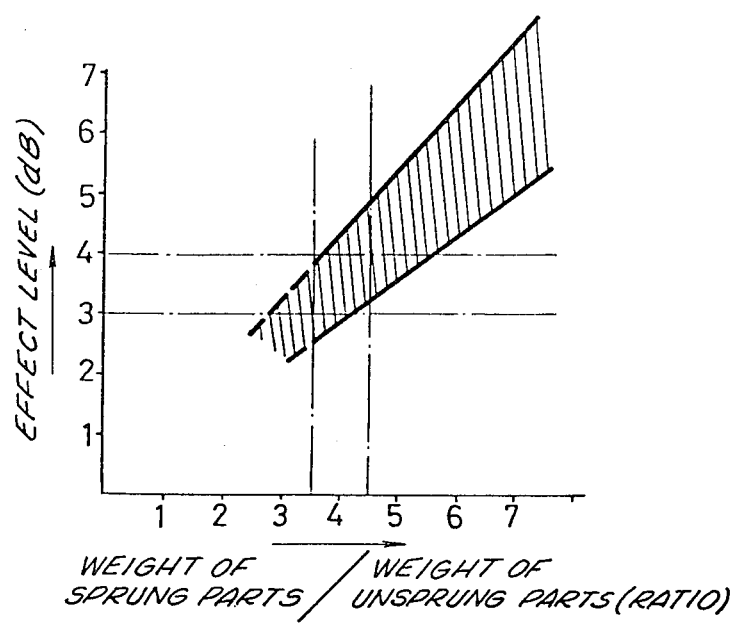
FIG. 8 is a graph in which the effect level is plotted against the ratio of the weight of sprung parts, as compared to the weight of unsprung parts.
Figure 9:
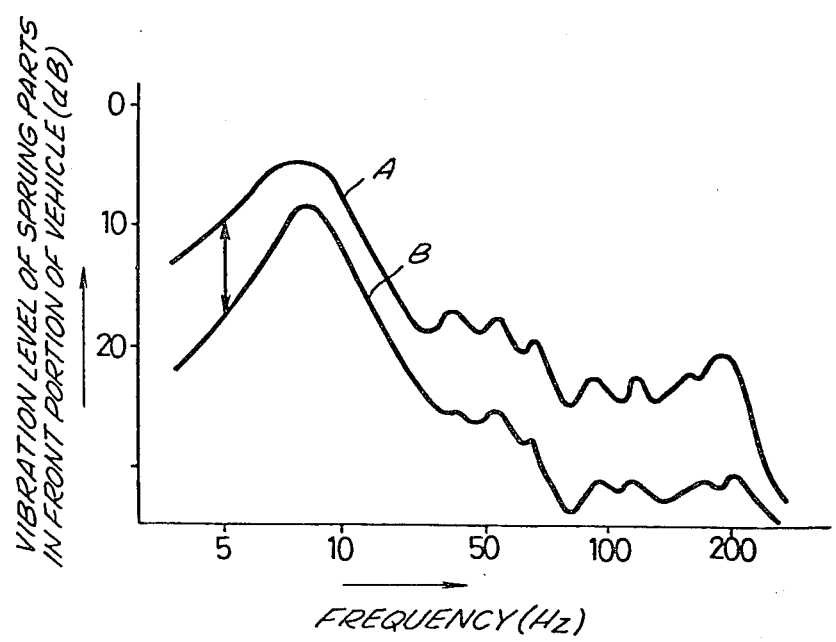
FIG. 9 is a graph showing the relationship of the Vibration Level of Sprung Parts on the front part of the vehicle as compared to the Frequency. The line A represents the performance of a conventional motorcycle, and line B shows the performance of a motorcycle embodying the compensation apparatus of this invention.

The effects obtained by provision of the compensation means according to the present invention are described in connection with data shown in FIGS. 8-11. FIGS. 8 and 9 show effects with measured values taken by providing the compensation means on motorcycles having telescopic front fork assemblies. The values represent the effect level of power spectra of vibration levels in the sprung parts connected to the body frame, which values are obtained by measuring the vibrations transmitted to the handle bars 30. Though some small differences can be seen depending on the types of motorcycles, the vibration level of most motorcycles falls within a range of the hatched zone in FIG. 8. The effectiveness of the compensation means of the invention is thus verified.

In FIG. 8, the abscissa represents the ratio of the weight of the sprung parts compared to the weight of the unsprung parts. The ordinate represents the effect level (dB) of the power spectra of the vibration level in the sprung parts of the vehicle. Tests have confirmed that, as shown in the graph of FIG. 8, the effects of the compensation means can be perceived by skilled riders when the effect level is higher than 3 dB and, in particular, anyone could confirm the effects when the level exceeds 4 dB. Further, with respect to the ratio of the weight of the sprung parts comparted to the weight of the unsprung parts, less effects are obtained when the ratio is lower than 3.5 but more effects are recognized thereabove. The effects become apparent when the level exceeds 4.5.

Referring to FIG. 9, the abscissa represents frequencies (Hz) and the ordinate represents vibration level in the sprung parts of the vehicle. The indication line A shows data of conventional motorcycles and the line B shows data of motorcycles provided with the compensation means. As evident from this graph, the compensation means has a remarkable attenuation effect on vibration levels.

Figure 10:
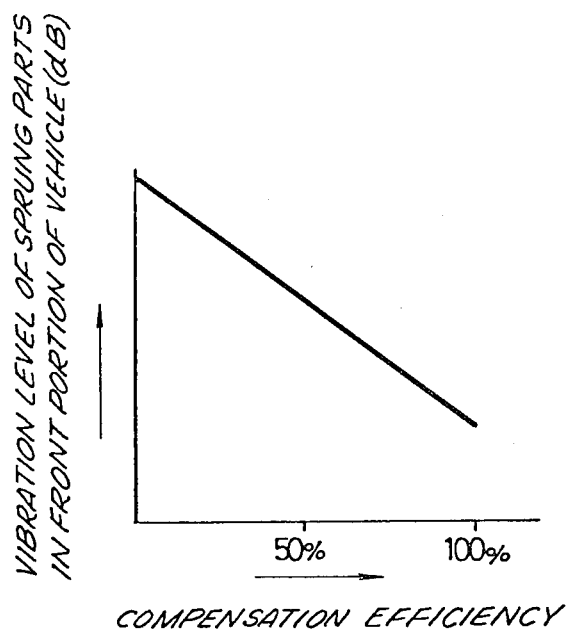
FIG. 10 is a graph showing the relationship of the Vibration Level of the Sprung Parts as compared to the Compensation Efficiency.

FIG. 10 is a graph which shows the compensation efficiency in the case that the compensation means are provided. In the first and second embodiments related to the basic principle constructions of the fork assembly shown in FIGS. 3 and 7, it is possible to compensate for the bending moment applied to the telescoping tubes and the bearing load caused thereby at any point between 0–100% of the compensation efficiency. However, the optimum compensation efficiency must be determined or selected by taking into account various factors such as the maximum speed, the loads on the sprung and unsprung parts of the vehicle and the load on the fork bearings, of the motorcycle to which the compensation means is applied. It can be generally said that as shown in the graph of FIG. 10, with the increase of the compensation efficiency towards 100%, the shock absorbing performance of the front fork assembly is improved so that the riding comfort is improved. The abscissa of the graph represents compensation efficiency and the ordinate represents vibration level of the sprung parts in the front portion of the vehicle.

Figure 11:
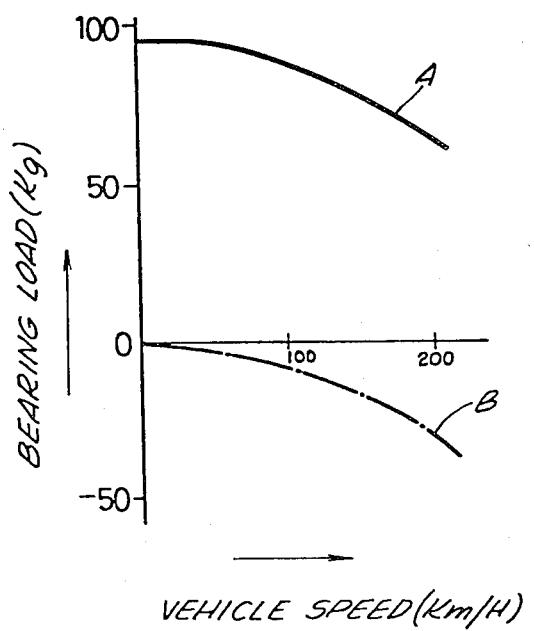
FIG. 11 is a graph showing the relationship between the Bearing Load and the Vehicle Speed.

With the increase of the vehicle speed, the load distribution on the motorcycle moves toward the rear wheel by the wind pressure on the vehicle body as well as on the rider so that the load on the front wheel becomes smaller. As shown by the solid indication line of curve A in FIG. 18, the load on the fork bearings decreases with the increase of the vehicle speed. Namely, FIG. 11 shows a variation of the load on the fork bearings with respect to the vehicle speed, wherein the abscissa represents the vehicle speeds (Km/H) and the ordinate represents the bearing loads (Kg). If the bearing loads should be fully compensated at 100% under static conditions, an increase in the vehicle speed would result in overcompensation as shown by the dot and dash line of curve B. In view of the foregoing, it can be said that when the compensation efficiency under unloaded conditions of the motorcycle is below 45%, the effects of compensation on the riding comfort are insufficient, and that with an increase of the compensation efficiency up to approximately 100%, the performance is improved. However, in the event the vehicle speed is increased, the adverse effects are induced by reverse moment acting counterclockwise. Thus, taking account of such factors as the types of motorcycles, the maximum speed, the loads on the sprung and unsprung parts, and the load on the fork bearings, the compensation efficiency may be selected in a range of 45% to 85% statically. With this selection, the improvement of the riding comfort and the optimum performance as well as the improvements of the road holding and the steering stability are all attained.

FIGS. 12 and 13 show conventional forms of front fork assemblies having hydraulic shock absorbers embodied therein. As shown in FIG. 12, the front fork assembly 92 comprises parallel fork tubes 93 and parallel bottom tubes 94. The fork tubes 93 are connected at their upper ends to bridges 97 and 98. These bridges are pivoted to a head tube 96 of a frame 99 by means of a stem shaft or the like. The bottom tubes 94 have an axle 95 extending between them to support the front wheel 91.

As shown in FIG. 13, each bottom tube 94 forms an outer housing member in which one of the fork tubes 93 is slidably fitted. Each bottom tube 94 is provided with an interior guide tube 100 fixed at its lower end to the closed bottom portion of the bottom tube 94. The guide tube 100 is provided with a supporting member 101 at its lower end, and is provided with fixed orifices 102. The fork tubes 93 are fitted into the bottom tubes 94 so as to enclose the guide tubes 100. Each fork tube 93 is provided in its lower end with an oil locking collar 103 and above it with a collar-shaped check valve 104, valve spring 105, valve body 106, and cushioning material 107 such as rubber. A piston 108 slidably fits the inside surface of each fork tube 93 and is fixed to the upper part of the guide tube 100. There is provided a main orifice 109 and above it a collar-shaped sliding valve 110 so as to be resiliently pressed by a spring 111. Each guide tube 100 is provided in its upper portion with a flange 112 interposed between the spring 111 and the main spring 113 of the fork tubes 93. The guide tube 100 is provided with fixed orifices 114 below the piston 108.

During the compression stroke of the front fork 92, as the clearance of the inside diameter part of the oil locking collar 103 is closed by the check valve 104, the oil below it is pressurized and the oil in the lower part of the guide tube 100 flows through the orifices 102 to produce a hydraulic damping force in the low speed ranges of the piston 108. In the high speed range of the piston 108, the check valve 104 opens and the oil flows against the lower surface of the piston 108. The chamber 117 below the oil locking collar 103 and the chamber 118 above it and below the piston 108 then communicate with each other through the oil locking collar 103 to obtain the damping force.

In the tension stroke of the front fork 92, the oil in the chamber 118 below the piston 108 is pressurized and flows into the guide tube 100 through the orifices 114 to attain a hydraulic damping force in the low speed range of the piston. In the high speed range of the piston 108, the sliding valve 110 opens, and the flow of oil is controlled by the total cross-sectional area of the orifices 114 and 109, to produce the damping force. A sealing member 115 and a dust seal 116 are provided to retain oil and to exclude foreign matter.

Having fully described our invention, it is to be understood that we are not to be limited by the details herein set forth but that our invention is of the full scope of the appended claims.

We claim:

1. A front wheel suspension assembly for a motorcycle comprising in combination: parallel telescoping forks of the hydraulic type which straddle the front wheel and which are inclined downward in a forward direction, thereby producing a bending moment in said forks with the motorcycle supported in an upright position upon a horizontal surface, each fork comprising an upper tube telescopically mounted within a bottom tube and containing a body of oil, said tubes having continuous cylindrical surfaces in sliding contact and lubricated by said body of oil, a bridge fixed to the upper portions of said upper tubes, means mounting the front wheel for rotation on said bottom tubes, torque receiving means fixed to said bottom tubes, and means including resilient means extending between said bridge and said torque receiving means for applying a counter bending moment to said forks in opposition to the first said bending moment, thereby reducing sliding friction between said telescoping tubes.

2. The combination set forth in claim 1 in which said torque receiving means comprises torque arm means extending rearward from said forks, and said resilient means comprise tension spring means connecting said bridge to said torque arm means.

3. The combination set forth in claim 1 in which said resilient means includes a compression spring extending from a location on said bridge to the rear of said forks to a location on said torque receiving means forward of said forks.

4. The combination set forth in claim 1 in which said torque receiving means comprises torque arm means extending rearward from said forks, a pair of links pivoted together and being pivotally connected with respect to said bridge and to said torque receiving means, and resilient torsion means acting on said links to apply an upward force to said torque receiving means.

5. A front wheel suspension assembly for a motorcycle comprising in combination: parallel telescoping forks of the hydraulic type which straddle the front wheel and which are inclined downward in a forward direction, thereby producing a bending moment in said forks with the motorcycle supported in an upright position upon a horizontal surface, each fork comprising an upper tube telescopically mounted within a bottom tube and containing a body of oil, said tubes having continuous cylindrical surfaces in sliding contact and lubricated by said body of oil, a bridge fixed to the upper portions of said upper tubes, means mounting the front wheel for rotation on said bottom tubes, torque arms fixed to the upper portions of said bottom tubes and extending rearward therefrom, and tension springs extending between said bridge and said torque arms for opposing said bending moment in said forks, thereby reducing sliding friction between said telescoping tubes.

6. A front wheel suspension assembly for a motorcycle comprising in combination: parallel telescoping forks of the hydraulic type which straddle the front wheel and which are inclined downward in a forward direction, thereby producing a bending moment in said forks with the motorcycle supported in an upright position upon a horizontal surface, each fork comprising an upper tube telescopically mounted within a bottom tube and containing a body of oil, said tubes having continuous cylindrical surfaces in sliding contact and lubricated by said body of oil, a bridge fixed to the upper portions of said upper tubes, means mounting the front wheel for rotation on said bottom tubes, an element fixed relative to said bottom tubes, and forward of said forks, a compression spring extending between said bridge and said element for opposing said bending moment in said forks, thereby reducing sliding friction between said telescoping tubes.

7. A front wheel suspension assembly for a motorcycle comprising in combination: parallel telescoping forks of the hydraulic type which straddle the front wheel and which are inclined downward in a forward direction, thereby producing a bending moment in said forks with the motorcycle supported in an upright position upon a horizontal surface, each fork comprising an upper tube telescopically mounted within a bottom tube and containing a body of oil, said tubes having continuous cylindrical surfaces in sliding contact and lubricated by said body of oil, a bridge fixed to the upper portions of said upper tubes, means mounting the front wheel for rotation on said bottom tubes, torque arms fixed to said bottom tubes and extending rearward therefrom, pivoted linkage extending between said bridge and said torque arms, and resilient means acting on said linkage for opposing said bending moment in said forks, thereby reducing sliding friction between said telescoping tubes.

* * * * *